United States Patent
Lall

(10) Patent No.: US 10,715,521 B2
(45) Date of Patent: Jul. 14, 2020

(54) BIOMETRIC FACE RECOGNITION BASED CONTINUOUS AUTHENTICATION AND AUTHORIZATION SYSTEM

(71) Applicant: CREDEXT TECHNOLOGIES PVT. LTD., Molarbandh Delhi (IN)

(72) Inventor: Brejesh Lall, Delhi (IN)

(73) Assignee: CREDEXT TECHNOLOGIES PVT. LTD., Molarbandh Delhi (IN)

( * ) Notice: Subject to any disclaimer, the term of this patent is extended or adjusted under 35 U.S.C. 154(b) by 174 days.

(21) Appl. No.: 15/765,993

(22) PCT Filed: May 9, 2017

(86) PCT No.: PCT/IN2017/050169
§ 371 (c)(1),
(2) Date: Apr. 4, 2018

(87) PCT Pub. No.: WO2017/195218
PCT Pub. Date: Nov. 16, 2017

(65) Prior Publication Data
US 2018/0288042 A1    Oct. 4, 2018

(30) Foreign Application Priority Data

May 12, 2016 (IN) .............................. 201611016528

(51) Int. Cl.
*H04L 29/00* (2006.01)
*H04L 29/06* (2006.01)
(Continued)

(52) U.S. Cl.
CPC .......... *H04L 63/0861* (2013.01); *G06F 21/32* (2013.01); *G06Q 10/10* (2013.01);
(Continued)

(58) Field of Classification Search
CPC . H04L 63/0861; H04L 63/083; H04L 63/102; H04L 63/12; H04L 9/3213;
(Continued)

(56) References Cited

U.S. PATENT DOCUMENTS

| 2006/0259755 | A1* | 11/2006 | Kenoyer | G06F 21/32 713/1 |
| 2013/0114865 | A1* | 5/2013 | Azar | G06F 21/40 382/118 |

(Continued)

FOREIGN PATENT DOCUMENTS

WO    2015127256 A1    8/2015

OTHER PUBLICATIONS

International Search Report of PCT Patent Application No. PCT/IN2017/050169 dated Sep. 11, 2017.

*Primary Examiner* — Ellen Tran
*Assistant Examiner* — Helai Salehi

(57) ABSTRACT

A method and system for continuously authenticating a user working from a remote location is provided. The method includes providing user an interface to login through his login credentials to company domain. The login credentials are authenticated by a company's remote server. Once the user is authenticated the server pushes user's secondary authentication details to user's device and invokes a secondary authentication system. The secondary authentication system may include a webcam that initiates once user is logged in and continuously monitors biometric parameters for continued authentication of the user.

20 Claims, 2 Drawing Sheets

(51) Int. Cl.
    *G06F 21/32*     (2013.01)
    *G06Q 10/10*     (2012.01)
    *H04L 9/32*      (2006.01)

(52) U.S. Cl.
    CPC .......... *H04L 9/3226* (2013.01); *H04L 9/3231* (2013.01); *H04L 63/083* (2013.01); *H04L 63/102* (2013.01); *H04L 63/12* (2013.01); *G06F 2221/2139* (2013.01)

(58) Field of Classification Search
    CPC ................. H04L 9/3268; G06F 21/32; G06F 2221/2139; G06F 21/33
    See application file for complete search history.

(56) References Cited

U.S. PATENT DOCUMENTS

| | | | |
|---|---|---|---|
| 2015/0242601 A1* | 8/2015 | Griffiths | G06F 21/305 726/5 |
| 2016/0127900 A1* | 5/2016 | John Archibald | H04W 12/06 726/7 |
| 2019/0109846 A1* | 4/2019 | Shieh | H04L 63/0861 |

* cited by examiner

BIOMETRIC FACE RECOGNITION BASED CONTINUOUS AUTHENTICATION AND AUTHORIZATION SYSTEM

FIELD OF THE INVENTION

The present disclosure generally relates to authenticating a user. More specifically, the present invention relates to a continuous authentication and authorization method and system especially in work from home scenarios over the public internet network.

BACKGROUND OF THE INVENTION

With the ever increasing workloads of employees of a company, there is an increasing demand for providing access of office infrastructure to employees from anywhere and everywhere. Employees could be either travelling due to work wherein to work from their current locations, they require access to a company's network. Further, the employees could also, be stuck in some situation at home for which they may request a permission to work from their homes. Also, the employees may be visiting any other office of the company from which they would like an access to work from their own office domain. All these situations add to IT infrastructure.

To provide such access to the employees, there are various solutions that are provided by today's IT. There exists VPN access wherein the employee is required to enter his credentials in order to enter office domain and work.

However, there is a drawback in such solutions. Once the employee enters, he or she may or may not work by himself and may take others help or since the employees are outbound someone may work on their behalf instead of the employee itself. This adds to the risk of data theft since the data of the company is confidential and may have restricted access for a specific employee only. Furthermore, other available solutions include providing dedicated connection channels that add to the cost of the company expenditure.

Therefore, there exists a need for an improved method and system to authenticate, authorize and constantly validate identity of the employee accessing office infrastructure without providing any dedicated channels in above mentioned situation.

SUMMARY OF INVENTION

The invention provides a solution to the above mentioned problems. For this the invention provides a method to continuously authenticate and authorize a user over the public internet network. The method includes a user initiating a user interface to login to a remote server. The user interface requires user's credentials to be input to the user interface. Once the user inputs his/her credentials, the data is sent to the remote server for authentication. The server stores credentials of multiple users and when it receives the credentials of a user the server authenticates it. In return to this the server pushes a secondary authentication data into the device through which the user is trying to login. Also, the remote server initiates a secondary authentication device like a digital camera etc. in order to continuously monitor the user's biometric scans like facial recognition etc. through which user is authenticated continuously. The biometric scans are matched with the secondary authentication data that is pushed by the server and that is stored in memory of the device from which user is trying to login.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
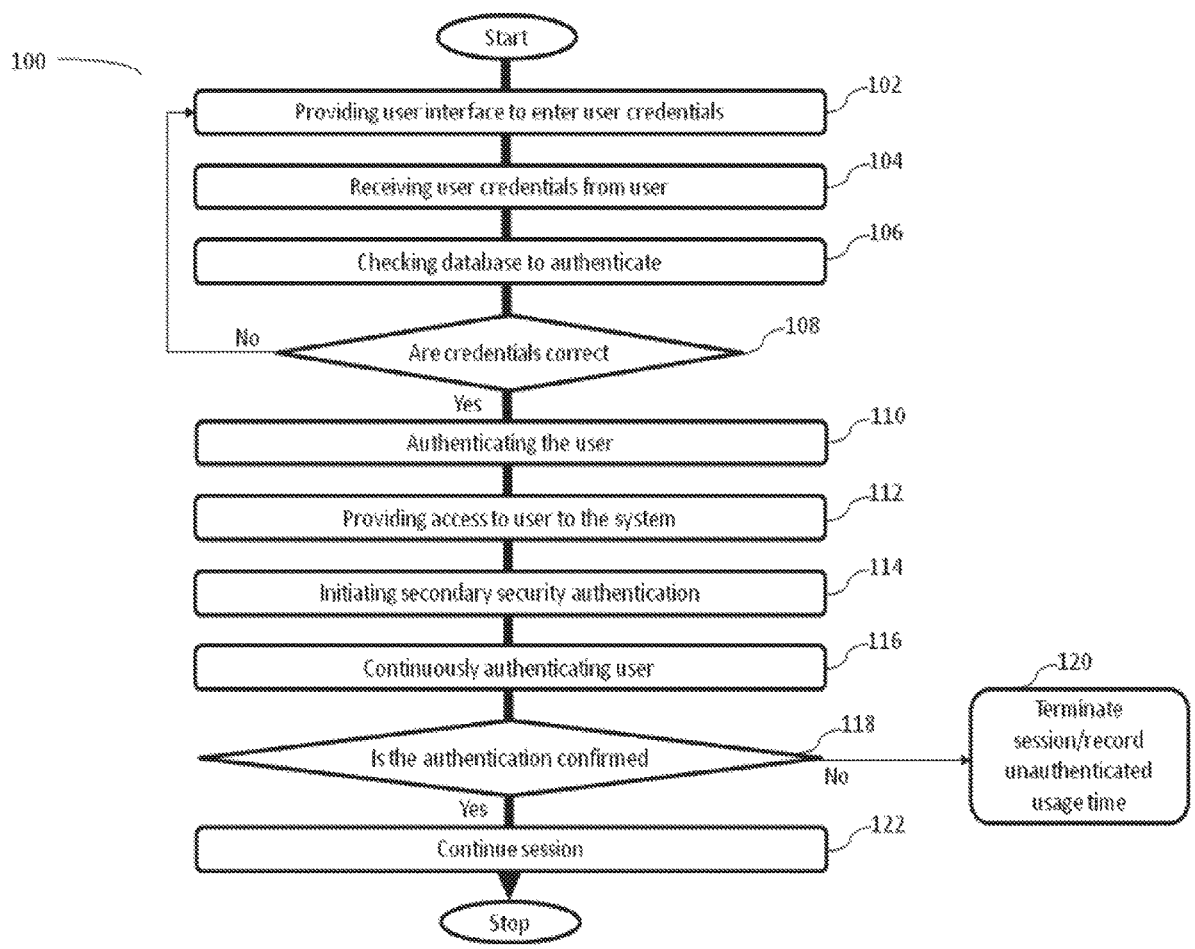
FIG. 1 illustrates a flow chart to depict a method according to an embodiment of the invention.

Referring to FIG. 1 which illustrates a method 100 to continuously authenticate a user according to an embodiment of the invention. The method starts at step 102 by displaying a master login interface to the user who wants to connect to a company server through a network. In an embodiment of the invention, the master login interface may include fields like username password or any biometric feature dialogue box like "place your finger" etc. Hence, first level of authentication may be either simply based on credentials or may be based on user's biometric scans like fingerprint, voice print, ophthalmic images facial recognition etc.

Moving to step 104, the user follows instructions and provides his input with credentials into the fields available on the master login interface displayed to the user. The master login interface receives user's inputs and sends these credential details over the network to the company server. In an embodiment of the invention the network can be anyone of a wired, wireless, a mobile network, 3G, 4G, LTE, etc. In another embodiment of the invention, the company server stores the credential details of all the users. At step 106, after the server receives credential from the user, it checks its database to find out whether the credentials are correct.

Still referring to FIG. 1, moving to step 108, the server after checking its database decides whether the credentials of the user are correct or not. If the credentials entered are wrong the server again displays the user credentials login user interface to the user. However, if the credentials supplied are correct, the server at step 110 authenticates the user. At step 112, the user is allowed access of company's network wherein the user is connected to company server and can work. At step 114, the method 100 initiates a re-authentication program for the user. In an embodiment of the invention, the secondary security authentication can be facial recognition, or ophthalmic recognition. In order to achieve this, on first authentication, the company server invokes a program on user's device that initiates webcam of the user's device. Also, the server sends the secondary authenticated credentials to the device itself that may be stored in a memory of the user's device in order to optimize network usage. In an embodiment of the invention, the user's device can be anyone of a laptop, personal computer, mobile, a tablet computer, a personal digital assistant, etc. At step 116, the webcam initiated at step 114 of the method 100, continuously monitors and re-authenticates the user by tracking its biometric scans that may include facial recognition or ophthalmic scans etc. At step 118, the server decided whether the user is authenticated or not. If not, then at step 120 the server may either terminate the session or can log the time of session for which the user was not authenticated and save the same. However, if the user is an authenticated user, the server allows the session to continue at step 122. Logs of the user authenticated sessions may also be recorded and the log file may be either maintained within the user device or by the company server itself.

Figure 2:
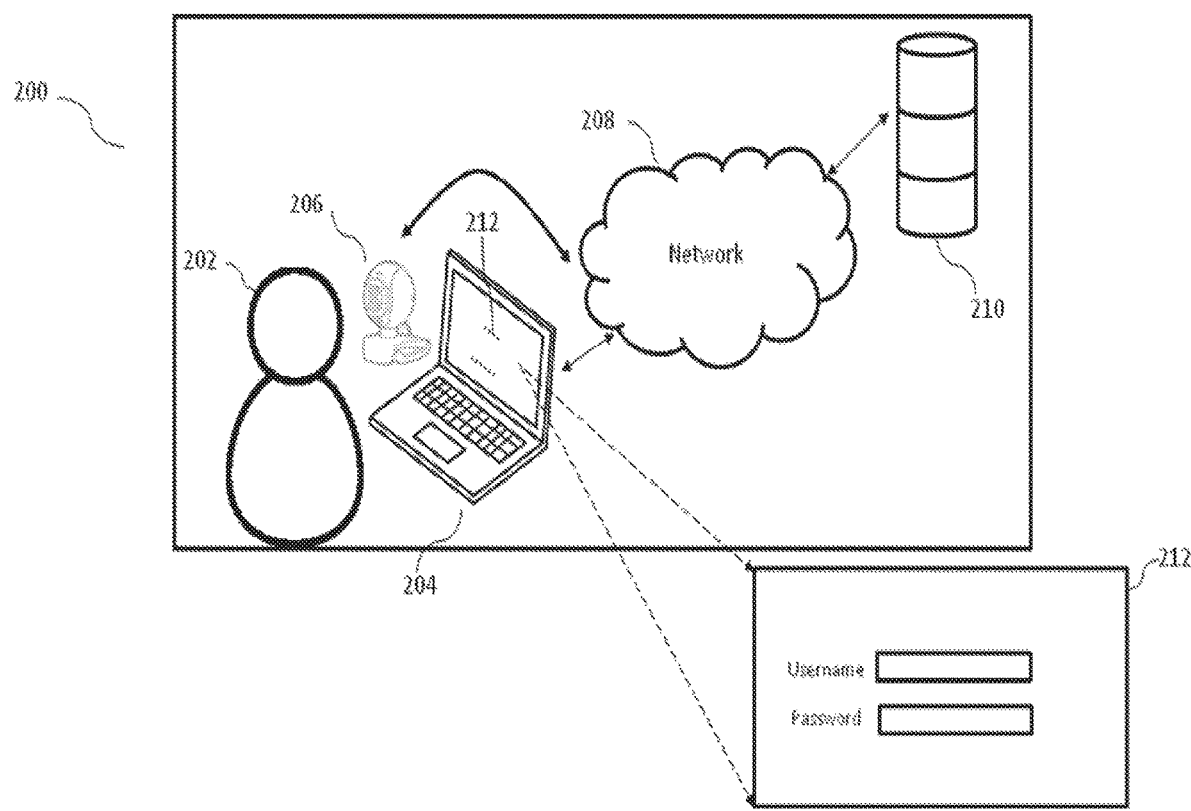
FIG. 2 illustrates a system according to another embodiment of the invention.

Now referring to FIG. 2, that illustrates a system 200, according to an embodiment of the invention, in order to continuously authenticate a user during an active session for e.g. in a work from home situation. The system includes a user 202 that requires an access to company's server 210. In an embodiment of the invention, the user 202 may be an outbound employee, a travelling employee, an employee on work from home facility, etc. In another embodiment of the invention, the company's server 210 stores the login credentials of all of the company's employees. The system further includes a user device 204 wherein, the user device 204 can be anyone of a laptop, a personal computer, a smartphone, a personal digital assistant, a smartwatch, or a tablet computer. The user device 204 is connected to the company's server 210 that is remotely placed through a network 208. Furthermore, the system 200 further includes a secondary authentication device 206 that is attached to the user's device 204 either wirelessly or through wires. Also, the secondary authentication device 206 may be attached to the server 210 through the network 208. In an embodiment of the invention the network 208 can be anyone of a wired, wireless, a mobile network, 3G, 4G, LTE, etc.

Still referring to FIG. 2 the user's device 204 is capable of displaying a user interface 212 pushed by the company's server 210 when the user 202 tries to access the company's server 210. The user interface 212 may either include login fields like username password or can simply prompt the user for biometric scans like ophthalmic scans using the secondary authentication device 206. When the user 202 inputs his login credentials, the login data is received by the company' server 210 over the network 208. The company's server 210 matches the data with the stored data. Once the credentials have been matched and the user credentials are identified, the user 202 is provided an access to the system. Simultaneously, the company's server 210 sends a command to the user's device 204 to invoke a security algorithm. Also, the company server 210 pushes the secondary authentication data to the user device 204 itself so that it is stored in memory of the user device 204. This is done so as to efficiently use the network since continuous authentication with remotely placed server would use high bandwidth. Therefore, it is beneficial to use the locally placed device to perform this function. The security algorithm invoked, initiates the secondary authentication device 206 that is a webcam. The webcam 206 then starts a process of continued authentication of the user 202 without disrupting work of the user 202. The webcam authenticates the user 202 by capturing facial recognition or ophthalmic scans. This authentication is then checked with the data pushed by the company's server 210 to the user's device 204. If the user 202 is authenticated, the session is continued otherwise either the session is terminated or a log is maintained of the time to which the user was not authenticated.

The foregoing description and drawings comprise illustrative embodiments of the present invention. Having thus described exemplary embodiments, it should be noted by those ordinarily skilled in the art that the within disclosures are exemplary only, and that various other alternatives, adaptations, and modifications may be made within the scope of the present invention.

Although the present invention has been illustrated and described as embodied in various exemplary embodiments, it should be understood that the present invention is not limited to the details shown herein. Since it will be appreciated that several of the above-disclosed and other features and functions, or alternatives thereof, may be desirably combined into many other different systems or applications. Various embodiments modifications presently unforeseen or unanticipated alternatives, modifications, variations, or improvements therein may subsequently be made by those skilled in the art, which are also intended to be encompassed by the following claims.

Merely listing or numbering the steps of a method in a certain order does not constitute any limitation on the order of the steps of that method. Many modifications and other embodiments of the invention will come to mind to one ordinarily skilled in the art to which this invention pertains having the benefit of the teachings presented in the foregoing descriptions and the associated drawings.

The principles associated with the various embodiment defined herein may be applied to other embodiments. Therefore, in no way, the examples or the description is intended to be limited to the embodiments shown along with the accompanying drawings but is to be provided broadest scope consistent with the principles and novel and invention features describe/disclosed or suggested herein. Any modifications, equivalent substitutions, improvements etc. within the spirit and principle of the present invention shall all be included in the scope of protection of the present invention.

The invention claimed is:

1. A method of continuous authentication of a user over a network comprising;

receiving, using a user interface at a user device, one or more user credentials for authenticating the user at a master login interface executing at the user device;

transmitting, from the user device to a server device, the one or more user credentials for the server device to authenticate the user at the user device by matching the one or more user credentials with one or more pre-stored user profiles in a server database, the user device and the server device communicating via a wired or a wireless communication link, over the network including the Internet, with each other;

matching, at the server device, the one or more user credentials with the one or more pre-stored user profiles in the server database for authenticating the user at the master login interface;

providing, to the user device by the server device, an access to work on server session, over the network, on a successful match of the one or more user credentials;

re-authenticating, by the server device, the user during the work on server session, over the network, wherein the re-authenticating comprises:

initiating, by the server device, a local device for continuously capturing user's biometric profile to continuously authenticate the user during the work on server session, the local device being in communication with the user device and the server device, and where the server device initiates the local device by invoking a security program to be executed at the user device;

capturing, by the local device, at least one biometric feature of the user;

sending, by the server device to the user device, biometric profile related to the user from the server database; and matching, either by the local device or by the server device, the captured biometric feature with the biometric profile related to the user that is sent from the server database by the server device to the user device, and wherein the matching of the captured biometric feature to authenticate the user, is completed by the local device either by acquiring, from the user device, the biometric profile related to the user sent to the user device by the server device or from the server database during the master login interface; and wherein only by successfully authenticating and reauthenticating the user at the user device at the master login interface and during the work on server session, the server device allows access, of the work on server session over the network, to the user at the user device from any location.

2. The method of claim 1, wherein at least one of the one or more user credentials is at least one of a password based credential, or a biometric authentication of the user, individually or in combination.

3. The method of claim 1, wherein the master login interface authentication is done by a remote database.

4. The method of claim 1, wherein the biometric profile for re-authentication is anyone or a combination of a fingerprint, ophthalmic scan, voice scan, or facial scan.

5. The method of claim 1, wherein the server device initiates the local device after the master login interface authentication.

6. The method of claim 2, wherein the biometric authentication is anyone or a combination of a fingerprint scan, ophthalmic scan, voice scan, or facial scan.

7. A system for continuous authentication of a user over a network comprising;
a user device, wherein the user device further includes;
  a user interface configured to receive one or more login credentials of the user for authenticating the user to activate a session; and
  a processor operatively connected to the user interface display, wherein the processor is configured to transmit the received one or more login credentials;
a server device communicatively coupled to the user device via a wired or a wireless communication link, over the network including the Internet, wherein the server device includes a server database to store one or more user profiles, and wherein the server device is further configured to:
  receive the one or more login credentials of the user to match the received one or more login credentials of the user with the stored one or more user profiles to authenticate the user at the user device to activate the session;
  provide access to the user device to activate the session, over the network, on a successful match of the one or more login credentials of the user;
  initiate a local authentication device for continuously capturing user's second set of user credentials to continuously authenticate the user during the session, over the network, and where the server device initiates the local authentication device by invoking a security program to be executed at the user device; and
  send, to the user device, a second set of user credentials related to the user from the server database; and
the local authentication device communicating with the user device and the server device, wherein the local authentication device is configured to:
  initiate once the one or more login credentials of the user are authenticated, by the server device,
  capture a second set of user credentials of the user while the user is active during the session at the user device;
  re-authenticate the user, during the session at the user device, by matching the captured second set of user credentials with the the received second set of user credentials related to the user that is sent from the server database by the server device to the user device on a successful initiation, and
  wherein the matching of the captured second set of user credentials, to re authenticate the user, is completed by the local authentication device either by acquiring, from the user device, the second set of user credentials related to the user that is sent to the user device by the server device or from the server database during the session; and
wherein by authenticating and re-authenticating the user at the user device in login and during the session, the server device allows access, of the session over the network, to the user at the user device from any location.

8. The system of claim 7, wherein then user device is selected form a group comprising a laptop, a tablet computer, a smartphone, a personal digital assistant, a smart watch, and a desktop.

9. The system of claim 7, wherein the local authentication device is internally or externally attached to the user device.

10. The system of claim 7, wherein the one or more login credentials are a username password.

11. The system of claim 7, wherein the second set of user credentials is selected from a group comprising a fingerprint scan, ophthalmic scan, voice scan, and a facial scan individually or in combination.

12. The system of claim 7, wherein the local authentication device is selected from group comprising a digital camera, fingerprint scanner, and a mic, individually or in combination.

13. The system of claim 7, wherein the user device and the server device communicate through a wired or wireless communication module, the communication module being selected from a group comprising a Universal Serial Bus (USB) module, a micro USB module, an Ethernet, a cable communication, a Bluetooth module, a Wi-Fi module, Zigbee module, a WLAN, a NearBytes module, and a Near Field Communication (NFC) module.

14. The system of claim 9, wherein the local authentication device is externally attached to the user device via a wired or a wireless connection.

15. A system for performing continuous authentication of an employee in work from home situation over a network comprising;
a user device, wherein the user device further includes;
  a user interface configured to receive user's login credentials for authenticating the user to activate a session; and a processor operatively connected to the user interface, wherein the processor is configured to transmit the received user's login credentials;

a server device communicatively coupled to the user device through the network, wherein the server device includes a server database to store a plurality of profiles of a plurality of users and wherein the server device is further configured to:

receive the user's login credentials to match the received user's login credentials with the stored plurality of profiles of the users to authenticate the user at the user device to activate the session;

provide access to the user device to activate the session, over the network, on a successful match of the user's login credentials;

initiate a local authentication device for continuously capturing user's second set of user credentials to continuously authenticate the user during the session, over the network;

the local authentication device communicating with the user device and the server device, wherein the local authentication device is configured to:

initiate once the user's login credentials are authenticated by the server device, capture a second set of user credentials of the user while the user is active during the session at the user device;

re-authenticate the user, during the session at the user device, by matching the captured second set of user credentials with a second set of user credentials related to the user that is received, by the local authentication device, from the server device on a successful initiation, and wherein the matching of the captured second set of user credentials, to re authenticate the user, is completed by the local authentication device by acquiring, the second set of user credentials related to the user, from the server database during the session; and wherein by authenticating and re-authenticating the user at the user device in login and during the session, the server device allows access, of the session over the network, to the user at the user device from any location.

16. The system of claim 15, wherein then user device is selected form a group comprising a laptop, a tablet computer, a smartphone, a personal digital assistant, a smart watch, and a desktop, and wherein the user device further includes a display with the user interface.

17. The system of claim 15, wherein the local authentication device is internally or externally attached to the user device.

18. The system of claim 15, wherein the server device is remotely placed and the server device initiates the local authentication device by invoking a security program to be executed at the user device.

19. The system of claim 15, wherein the server device is further configured to send, to the user device, the second set of user credentials related to the user from the server database, and wherein the matching of the captured second set of user credentials, to re authenticate the user, is completed by the local authentication device by acquiring, from the user device, the second set of user credentials related to the user that is sent to the user device by the server device.

20. The system of claim 18, wherein the network includes the Internet.

* * * * *